No. 621,366. Patented Mar. 21, 1899.
K. OLSEN.
JOINT FOR FRACTURE APPARATUS.
(Application filed Oct. 31, 1898.)

(No Model.)

WITNESSES:
Hansa Becken
I. A. Becken.

INVENTOR
Karl Olsen
BY
Axel V. Beckn
ATTORNEY

THE NORRIS PETERS CO., PHOTO-LITHO., WASHINGTON, D. C.

UNITED STATES PATENT OFFICE.

KARL OLSEN, OF NEW YORK, N. Y.

JOINT FOR FRACTURE APPARATUS.

SPECIFICATION forming part of Letters Patent No. 621,366, dated March 21, 1899.

Application filed October 31, 1898. Serial No. 695,000. (No model.)

*To all whom it may concern:*

Be it known that I, KARL OLSEN, a citizen of the United States, residing in New York, (Long Island City,) in the county of Queens and State of New York, have invented certain new and useful Improvements in Joints for Fracture Apparatus, of which the following is a specification.

The present invention relates to joints for fracture apparatus; and it consists of the combination of coöperative elements hereinafter described.

The object of my invention has been to produce a joint having greater lasting qualities than any hitherto-known device of an analogous character, and this I have accomplished by means of the construction hereinafter set forth.

In describing my invention I refer to the accompanying drawings, in which—

Figure 1:
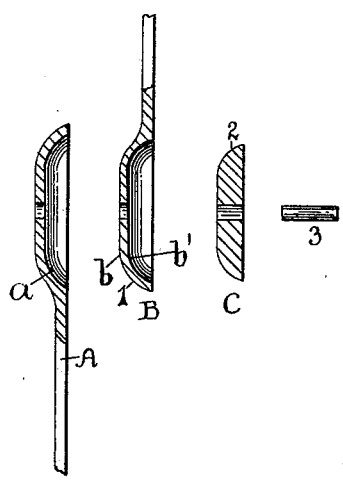
Figure 2:
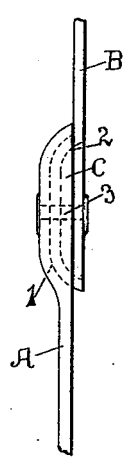
Figure 3:
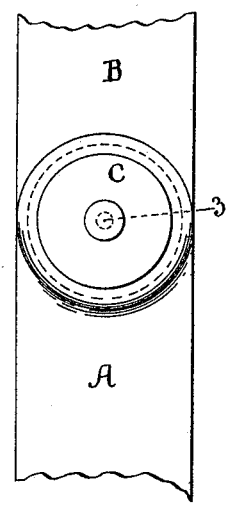
Figure 4:
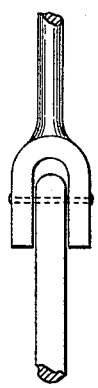

Figure 1 shows the different parts of a joint of a splint separated and in section. Fig. 2 shows the parts assembled. Fig. 3 is another view of the assembled parts. Fig. 4 shows an old construction of joints used in fracture apparatus.

Similar letters and numerals of reference indicate corresponding parts in all views.

I will describe a joint of a fracture apparatus embodying my invention, and afterward point out the novel features in a claim.

A is a lower member of a splint forming part of a joint and is provided with a concavity $a$, into which fits a corresponding convex surface $b$ of the member B.

B is an upper member of a splint, also forming part of the joint, and is provided with a convex surface $b$ and a concave surface $b'$.

C is a disk or washer adapted to fit into the concavity $b'$.

3 is a pin for holding the assembled parts together, as shown in Fig. 2.

In Fig. 4 I have shown a type of the construction hitherto employed in this art, and on studying this figure it will be observed that the whole strain and wear falls on the pin, and as a consequence, the latter is soon worn out and the joint breaks. This defect is obviated in my invention for the reason that the strain will wear three surfaces instead of one. The three wearing-surfaces in my joint are located as follows: at the place marked 1, where the surfaces $a$ and $b$ engage with each other; at 2, where the surfaces $b'$ and C bear against each other, and, thirdly, on the pin 3. In thus distributing the wear on a number of surfaces greater than one I produce a superior joint of greater durability and also a joint that works more snugly and which will not rattle after a slight wear, as other joints are apt to. Another advantage which accrues from my invention is the small expense attached in producing it. The joint shown in Fig. 4, for instance, has to be forged into the proper shape and form, an operation which is comparatively costly. The different members composing my joint, on the other hand, can be stamped out at a greatly-reduced cost.

Having thus described my invention, what I claim is—

The combination in a joint of a fracture apparatus of the lower concavo-convex member A, the upper concavo-convex member B and the convex disk or washer C, horizontally arranged with regard to each other, with the bolt or rivet 3, substantially as described.

In testimony that I claim the foregoing I have hereunto set my hand this 10th day of October, 1898.

KARL OLSEN.

Witnesses:
E. BERGER,
AXEL V. BEEKER.